Aug. 2, 1932.  S. KOMFALA  1,869,698
STEERING MECHANISM FOR AUTOMOBILES
Filed Sept. 9, 1929
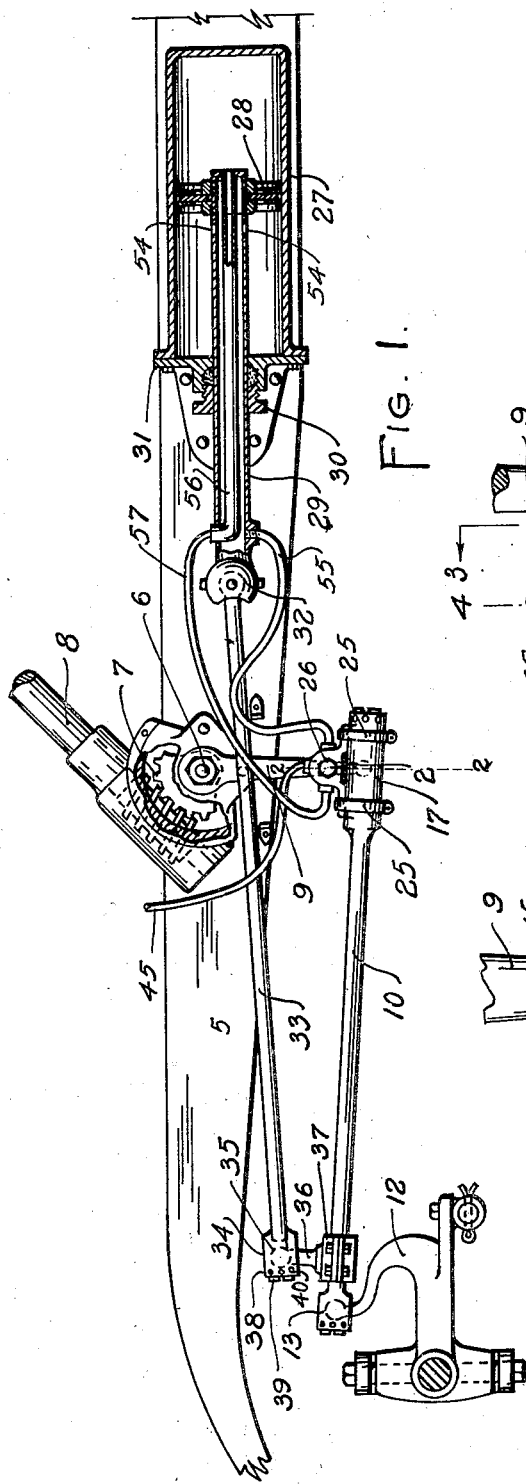
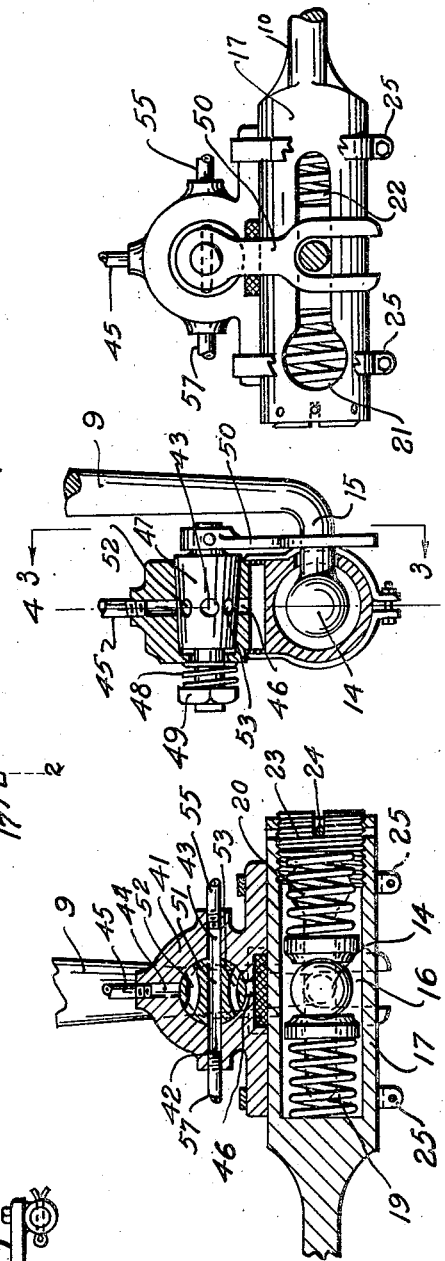
INVENTOR.
Steve Komfala
BY Rollander + Stratton
ATTORNEYS.

Patented Aug. 2, 1932

1,869,698

UNITED STATES PATENT OFFICE

STEVE KOMFALA, OF DENVER, COLORADO

STEERING MECHANISM FOR AUTOMOBILES

Application filed September 9, 1929. Serial No. 391,229.

This invention relates to steering gears for motor driven vehicles and its primary object is to provide in association with the hand-operated gear at present in use, a power-impelled means to assist the steering action and thereby relieve the driver of the vehicle from much of the effort required to turn the road wheels to which the steering gear is applied, in the desired direction.

A further object is to provide in a motor vehicle, an appliance for operation of the steering gear by fluid pressure.

Another object of the invention resides in the provision of an appliance which, if so desired, may perform the steering action entirely by applied power when actuated by the driver, and still a further object is to provide an appliance of the above stated nature, that is operated by fluid-pressure produced in the operation of the engine of the vehicle to which the appliance is connected.

Other objects of the invention may be found in details of construction and novel and useful arrangements and combinations of parts as will fully appear in the course of the following description.

In the accompanying drawing in which like characters of reference designate corresponding parts throughout the views, Figure 1 represents a sectional elevation of the invention in its operative relation to the steering gear of a motor vehicle, Figure 2, a section on the line 2—2, Figure 1, drawn to an enlarged scale, Figure 3, a section along the line 3—3, Figure 2, and Figure 4, a section on the line 4—4, Figure 2.

Referring further to the drawing, the numeral 5 designates a part of the frame or chassis of a motor driven vehicle and 6 the rocker shaft, which by a worm-gear 7 is connected with the steering rod 8. A so-called pitman-arm 9 transmits the movement of the shaft to the drag rod 10 which is pivotally connected with the steering arm 12 through the medium of a ball-and-socket joint 13.

The above named parts are those found in similar association, in most automobiles at present in use.

The connection of the pitman arm with the drag rod is established through the medium of a ball 14 at the end of a neck 15 projecting laterally from the end of the arm.

The ball is disposed in a chamber 16 of the head 17 of the drag rod between two coiled springs 19 and 20 which cushion the movement transmitting action of the pitman arm.

The ball is inserted into the head through an enlargement 21 at an end of a slot 22 in a side thereof, and the neck of the ball extends loosely through the slot to permit of movement of the ball against the resisting pressure of the springs.

A screw plug 23 at the end of the head of the drag rod, held against displacement by a cotter pin 24, permits of varying the tension of the springs.

The appliance embodying the present invention, comprises a valve element 26 fastened upon the head of the drag rod by straps 25 and a cylinder element 27 bolted to the chassis or other convenient part of the vehicle.

A piston 28 fitted for reciprocation in the cylinder is fastened at the end of a rod 29 which extends through a stuffing box 30 on the head 31 of the cylinder.

A ball-and-socket joint 32 connects the piston rod with the end of a connecting rod 33 which at its opposite extremity is connected with the drag rod 10 by a ball-and-socket joint 34.

The last mentioned joint is composed of a ball 35 at the end of a stem 36 which by means of a clamp 37 is rigidly fastened upon the drag rod, and a socketed head 38 on the connecting rod in which the ball is movably fitted.

The rod is inserted in the socket through an opening in the end of the head which is normally closed by a screw plug 39 held in place by a cotter pin 40.

The valve fastened upon the head of the drag rod consists of a housing 41 having opposite ports 42 and 43 connected with the cylinder at opposite sides of its piston as will be hereinafter more fully explained.

A port 44 is connected with the intake manifold of the engine or other suitable source of fluid-pressure by a flexible conduit 45 and a port 46 connects with the atmosphere.

A tapered plug 47 fitted in the housing is held in fluid tight contact therewith by a spring 48 between the housing and a nut 49 at a reduced end of the plug, projecting outside the housing, and a forked arm 50 at the opposite end of the plug straddles the neck of the pitman arm outside the head of the drag rod.

The valve plug has three transverse channels 51, 52 and 53. The middle one, 51, connects the ports 42 and 43 in one position of the plug and the other channels 52 and 53 connect the ports 42 and 43 with the ports 44 and 46 in another position of the plug.

The connections between the ports of the valve housing and the cylinder are established through the medium of the piston rod.

The piston rod is tubular and it has at one side of the piston, one or more openings 54 that connect its hollow with the interior of the cylinder.

The hollow of the rod is at the opposite end thereof, connected with the valve port 43 by a flexible conduit 55.

A pipe 56 in the hollow of the piston rod extends through the piston and has its end in communication with the cylinder at the side of the piston opposite to that connected with the interior of the rod.

The opposite end of the pipe extending through an opening in the side of the piston rod, is connected with the port 42 of the valve housing by means of a flexible conduit 57.

Under normal conditions when the steering gear is in its neutral position, the pressures of the springs 19 and 20, being equal, hold the ball on the pitman in a central position with reference to the valve element 26. The passages 52 and 53 in the valve plug are in this position, out of register with the ports and the passage 51 is in register with the ports 42 and 43 thereby connecting said ports with the interior of the cylinder, as shown in Figure 4. The pressures at opposite sides of the piston are thus equalized when the steering gear is in its neutral condition.

When by rotation of the steering rod 8, the shaft 6 is turned, the resulting movement of the pitman arm, causes compression of one of the springs and with it a partial rotation of the valve plug through the medium of the forked arm 50.

As a result of this movement of the valve plug, the spaces of the cylinder at opposite sides of the piston, are connected respectively with the intake manifold and the atmosphere.

The intake manifold has a partial vacuum and the consequent difference in pressures in the cylinder spaces, effects a movement of the piston which aids the operation of the steering gear.

The movement of the piston also absorbs road-shocks that are usually transmitted through the steering gear, and thereby relieves the driver of the unpleasant and harmful effects thereof.

It is to be understood that by reversing the connections between the ports 42 and 43 of the valve, and the spaces of the cylinder at opposite sides of the piston, a pressure above atmospheric, may be used to move the piston, and that within the scope of the invention, the fluid pressure appliance may be employed to entirely operate the steering gear, when actuated by the driver of the vehicle.

What I claim and desire to secure by Letters Patent is:

1. In a motor-driven vehicle having a steering gear, a cylinder, a piston in the cylinder, a rod for the piston, in operative connection with the steering gear, a valve element outside the cylinder adapted to connect cylinder spaces at opposite sides of the piston with sources of differing fluid pressures through the medium of the piston rod, the latter having ducts connecting the valve-element with the cylinder spaces, and means for actuation of the valve element connected to be operated by the steering gear.

2. In a motor-driven vehicle, a steering gear including a rocker shaft, a drag rod in operative connection with a road wheel of the vehicle, a pitman arm connecting the shaft with the drag rod, a cylinder, a piston in the cylinder in driving connection with the drag rod, a valve element mounted on the drag rod and adapted to connect the cylinder at a side of the piston with a source of fluid pressure, and means for actuation of the valve element by movement of the rocker shaft.

3. In a motor-driven vehicle, a steering gear including a rocker shaft, a drag rod having a head, a pitman arm on the rod in pivotal connection with the head, an appliance for operating the steering gear by fluid pressure, and a valve element mounted on the rod controlling the appliance, and including a movable member provided with an arm disposed to move in conjunction with the pitman arm.

4. In a motor driven vehicle having a steering gear, a cylinder, a hollow piston rod in the cylinder in operative connection with the steering gear, a piston within the cylinder disposed on the rod, a pipe within the piston rod, the space within the rod around the pipe and the space within the pipe respectively connecting with spaces in the cylinder at opposite sides of the piston, a valve outside of the cylinder arranged to connect the pipe and the hollow rod respectively with sources of differing fluid pressures, and means to actuate the valve.

In testimony whereof I have affixed my signature.

STEVE KOMFALA.